US007654631B2

(12) United States Patent
Takeishi et al.

(10) Patent No.: US 7,654,631 B2
(45) Date of Patent: Feb. 2, 2010

(54) METHOD OF CALCULATING THRESHOLD VALUE, AND LIQUID EJECTING APPARATUS OPERABLE TO EXECUTE THE SAME

(75) Inventors: Tetsuji Takeishi, Shiojiri (JP); Kenji Hatada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 472 days.

(21) Appl. No.: 11/732,378

(22) Filed: Apr. 3, 2007

(65) Prior Publication Data

US 2008/0036814 A1 Feb. 14, 2008

(30) Foreign Application Priority Data

Apr. 3, 2006 (JP) .......................... P.2006-101678

(51) Int. Cl.
*B41J 29/393* (2006.01)
*G01N 21/86* (2006.01)
*G01V 8/00* (2006.01)

(52) U.S. Cl. ...................................... 347/19; 250/559.4

(58) Field of Classification Search ................... 347/19; 250/559.4
See application file for complete search history.

(56) References Cited

U.S. PATENT DOCUMENTS 6,348,697 B1 * 2/2002 Kitajima .................. 250/559.4
6,945,721 B2 9/2005 Sato
2006/0055718 A1 * 3/2006 Endo et al. .................... 347/14

FOREIGN PATENT DOCUMENTS

| | | |
|---|---|---|
| JP | 6-277149 | 9/1994 |
| JP | 2000-109243 | 4/2000 |
| JP | 2003-260829 | 9/2003 |
| JP | 2004-182361 | 7/2004 |
| JP | 2005-081750 | 3/2005 |

* cited by examiner

*Primary Examiner*—Julian D Huffman
(74) *Attorney, Agent, or Firm*—Nutter McClennen & Fish LLP; John J. Penny, Jr.

(57) ABSTRACT

In order to calculate a threshold value for a detection signal output from an optical sensor in accordance with a state of a target object in a liquid ejecting apparatus, the optical sensor includes a light emitting element operable to irradiate the detected object and a light receiving element operable to detect a light amount which varies in accordance with the state of the target object. The detection signal is output from the optical sensor, based on the detected light amount. A level of the detection signal is adjusted so as to fall within a prescribed range. The threshold value is calculated based on the adjusted level of the detection signal.

7 Claims, 8 Drawing Sheets

METHOD OF CALCULATING THRESHOLD VALUE, AND LIQUID EJECTING APPARATUS OPERABLE TO EXECUTE THE SAME

BACKGROUND

1. Technical Field

The present invention relates to a method of calculating a threshold value and a liquid ejecting apparatus operable to execute the same.

2. Related Art

As an ink jet printer that performs printing on a printing medium such as paper, there is known an ink jet printer comprising: a printing head that ejects ink droplets onto a printing medium; and a carriage mounting the printing head. In this kind of ink jet printer, an optical sensor having a light emitting element and a light receiving element is widely used. For example, in an ink jet printer, an optical sensor is used as a detector for detecting an edge of a printing medium loaded inside the ink jet printer. The optical sensor is fixed on a bottom face side of a carriage. Such a configuration is disclosed in Japanese Patent Publication No. 2005-81750A (JP-A-2005-81750).

In the ink jet printer, it is general that a predetermined threshold value of an output signal from an optical sensor is calculated in order to detect an edge of a printing medium. As a method of calculating the threshold value, a protrusion (rib) formed on a platen opposite to an ink ejecting face of a printing head is detected by an optical sensor and then a threshold value is calculated on the basis of an output signal of the optical sensor at the time of the detection. Such a technique is disclosed in Japanese Patent, Publication No. 2003-260829A (JP-A-2003-260829). In this technique, in order to suppress the detection accuracy of a detector from lowering due to level fluctuation of an output signal occurring as a light emitting element or the like deteriorates as time goes by, a threshold value is varied in three steps corresponding to the level of the output signal from the optical sensor when the protrusion is detected.

In the ink jet printer, it is known that an ink mist (a part of ink droplets floating in the air in the form of mist) is generated and the generated ink mist adheres to each component inside the printer when ink droplets are ejected from a printing head before the ink droplets arrive at the surface of a printing medium. For example, the ink mist adheres to a light emitting face of a light emitting element or a light receiving face of a light receiving element included in a detector. Furthermore, it is known that a light emission amount of a light emitting element generally decreases as time goes by.

Moreover, in recent years, an ink jet printer capable of performing highly precise printing is demanded in the market. Particularly in a commercial printer, improvement in the printing accuracy is requested. In order to realize the highly precise printing, it is necessary to reliably maintain, the detection accuracy of an optical sensor used in a printer.

However, in the technique disclosed in JP-A-2003-260829, a threshold value of an output signal changes in a stepwise manner in three steps. Accordingly, it is not satisfactory for a recent printer for which it is necessary to reliably maintain the detection accuracy of the optical sensor. Rather, there is needed a complex operation for calculating the threshold value corresponding to the level of the output signal when the protrusion is detected, or it is necessary to create a table of multiple threshold values corresponding to the level of the output signal when the protrusion is detected and to store the large-capacity table in a controller of a printer. For this reason, the configuration of the printer or operation processing performed in the printer become complicated.

SUMMARY

It is therefore one advantageous aspect of the invention to provide a simple method of calculating an threshold value which is capable of reliably maintaining the detection accuracy of an optical sensor, and to provide a liquid ejecting apparatus operable to execute such a method.

According to one aspect of the invention, there is provided a method of calculating a threshold value for a detection signal output from an optical sensor in accordance with a state of a target object in a liquid ejecting apparatus, the method comprising:

providing the optical sensor so as to include a light emitting element operable to irradiate the detected object and a light receiving element operable to detect a light amount which varies in accordance with the state of the target object;

outputting the detection signal from the optical sensor, based on the detected light amount;

adjusting a level of the detection signal so as to fall within a prescribed range; and calculating the threshold value based on the adjusted level of the detection signal.

The level of the detection signal may be adjusted by adjusting luminance of the light emitting element.

The method may further comprise:

adjusting an output gain of the light receiving element in a case where it is impossible to cause the level of the detection signal to fall within the prescribed range; and adjusting the luminance of the light emitting element again, after the output gain of the light receiving element is adjusted.

The level of the detection signal may be so adjusted that a signal level obtained when the target object is detected falls within the prescribed range, in a case where the light receiving element is adapted to receive light reflected from the target medium.

According to one aspect of the invention, there is provided a liquid ejecting apparatus, comprising:

an optical sensor, operable to output a detection signal indicative of a state of a target object, the optical sensor including a light emitting element operable to irradiate the target medium and a light receiving element operable to detect a light amount which varies in accordance with the state of the target object;

a signal level adjuster, operable to adjust a level of the detection signal so as to fall within a prescribed range; and a calculator, operable to calculate a threshold value for the detection signal based on the level of the detection signal adjusted by the signal level adjuster.

The liquid ejecting apparatus may further comprise: a liquid ejecting head, operable to eject liquid toward a target medium; and a carriage, operable to carry the liquid ejecting head in a prescribed-direction. The optical sensor may be provided on the carriage. The target object may be an edge of the target medium.

The light receiving element may be adapted to receive light reflected from the target medium.

DETAILED DESCRIPTION OF EXEMPLARY EMBODIMENTS

Exemplary embodiments of the invention will be described below in detail with reference to the accompanying drawings.

Figure 1:
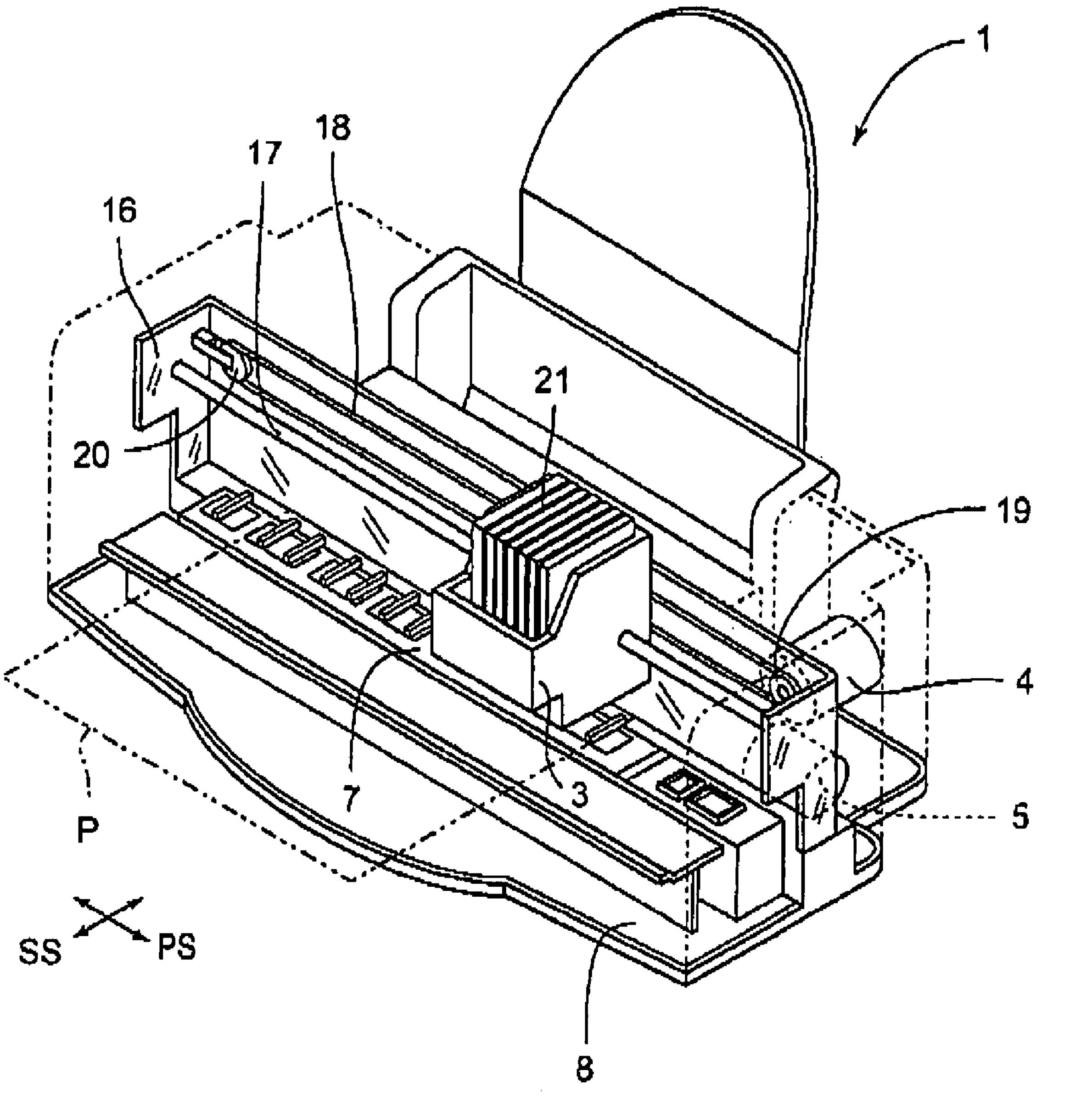
FIG. 1 is a perspective view showing an internal configuration of an ink jet printer according to one embodiment of the invention.
Figure 2:
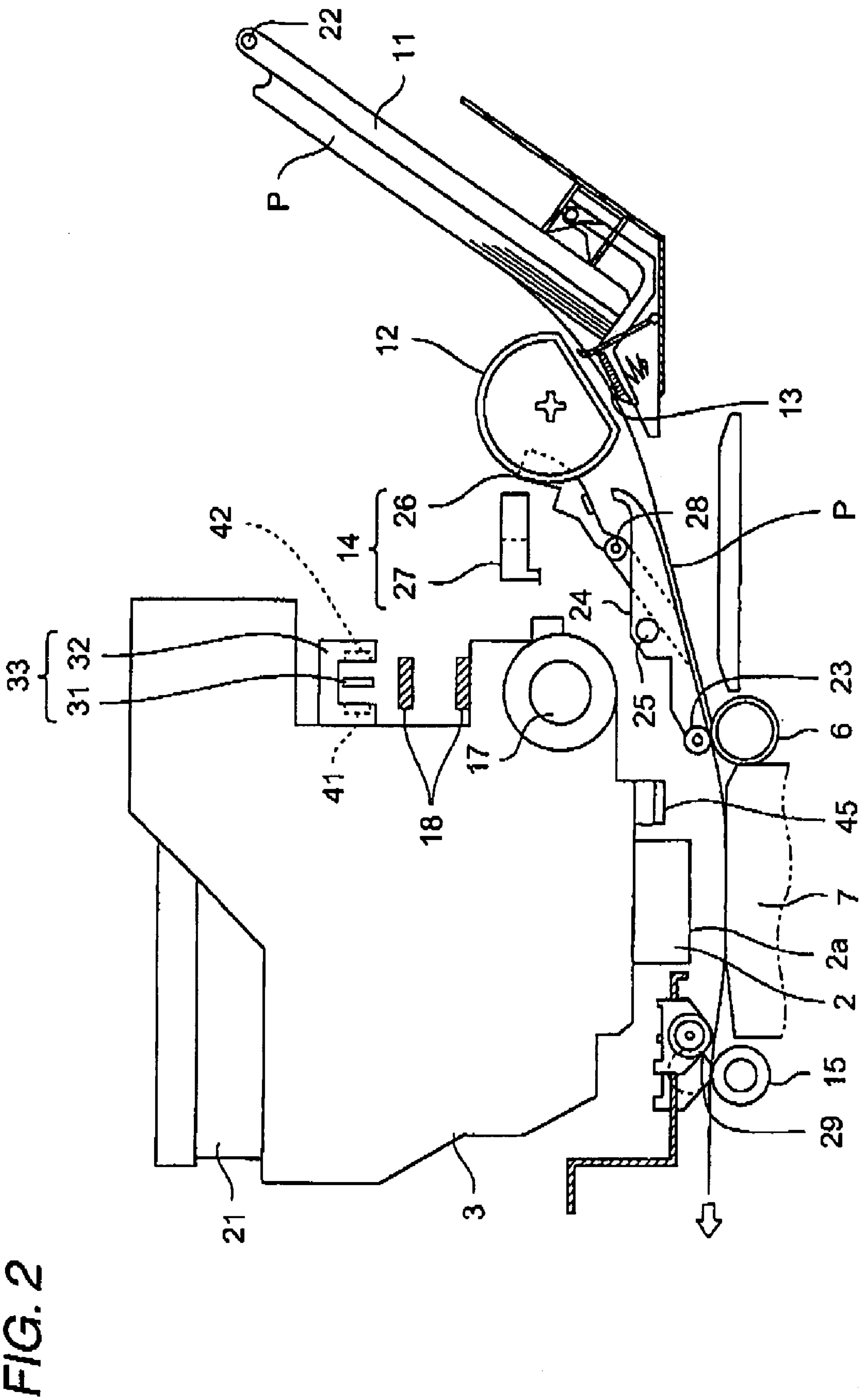
FIG. 2 is a side section view showing the internal configuration of the ink jet printer.
Figure 3:
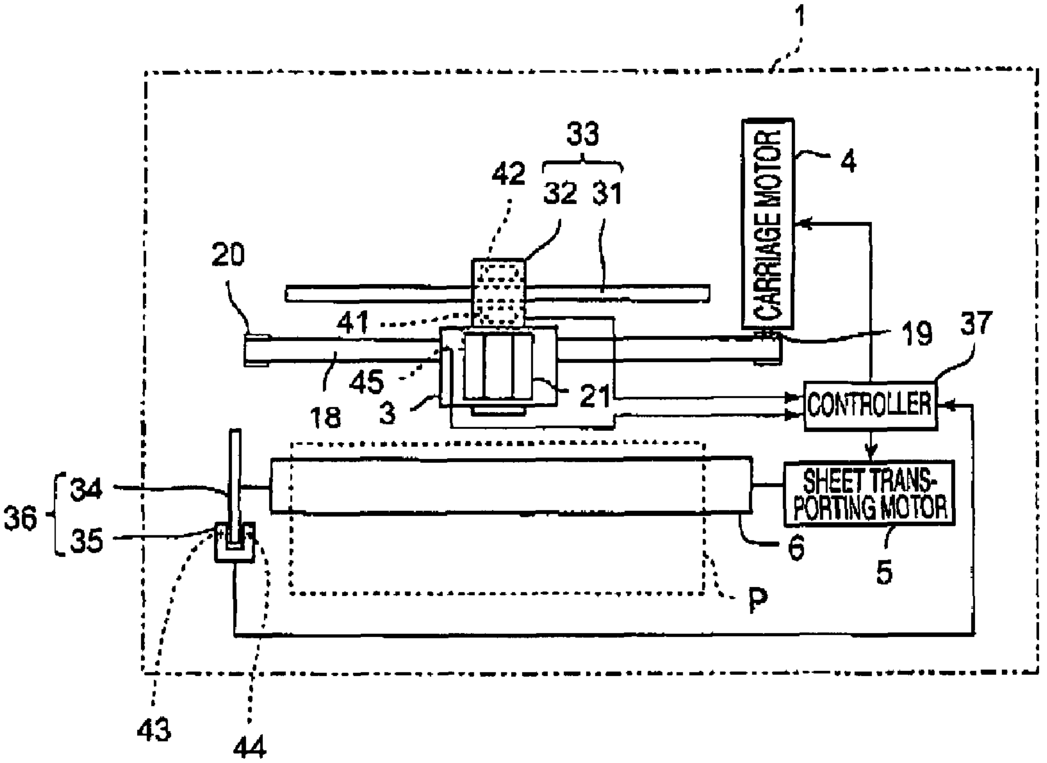
FIG. 3 is a block diagram showing detection mechanisms in the ink jet printer.

A printer 1 according to one embodiment of the invention is an ink jet printer that performs printing by ejecting ink onto a printing sheet P. As shown in FIGS. 1 to 3, the printer 1 comprises: a carriage 3 mounting a printing head 2 that ejects ink droplets; a carriage motor 4 that drives the carriage 3 in a primary scanning direction PS; a sheet transporting motor 5 that carries the printing sheet P in a secondary scanning direction SS; a sheet transporting roller 6 connected to the sheet transporting motor 5; a platen 7 disposed to oppose an ink ejecting face (lower face in FIG. 2) 2*a* of the printing head 2; and a body chassis 8 in which the constituent parts described above are mounted. Moreover, the printing sheet P in this embodiment includes regular paper used for normal document printing, photo paper used for photography printing, heavy paper thicker than the regular paper or the photo paper, and a transparent film such as seal or OHP sheet.

Further, as shown in FIG. 2, the printer 1 comprises: a hopper 11 on which the printing sheet P before printing is placed; a sheet feeding roller 12 and a separating pad 13 that guide the printing sheet P placed on the hopper 11 to the inside of the printer 1; a sheet detector 14 that detects passing of the printing sheet P guided from the hopper 11 to the inside of the printer 1; and a sheet ejecting roller 15 that ejects the printing sheet P from the inside of the printer 1.

The carriage 3 can move in the primary scanning direction PS along a guide shaft 17 supported by a support frame 16 fixed to the body chassis 8 and a timing belt 18. That is, the timing belt 18 is disposed to have constant tension under a state in which a part of the timing belt 18 is fixed to the carriage 3 (refer to FIG. 2) and is stretched between a pulley 19 fixed to an output shaft of the carriage motor 4 and a pulley 20 rotatably fixed to the support frame 16. The guide shaft 17 slidably holds the carriage 3 so that the carriage 3 is guided in the primary scanning direction PS. Moreover, in addition to the printing head 2, an ink cartridge 21 in which various kinds of ink supplied to the printing head 2 are contained is mounted on the carriage 3.

The printing head 2 is provided with a plurality of nozzles (not shown). In addition, piezoelectric elements (not shown), each of which is a kind of an electrostrictive element and has high responsiveness, are provided in the printing head 2 so as to correspond to nozzles, for example. Specifically, the piezoelectric elements are disposed at the position abutting a wall face that forms an ink flow path (not shown). Then, when the wall face is pressed due to operations of the piezoelectric element, the printing head 2 ejects ink droplets from nozzles disposed at an end of the ink flow path. Specifically, the printing head 2 ejects ink from the ink ejecting face 2*a*.

The sheet feeding roller 12 is connected with the sheet transporting motor 5 through a gear (not shown), such that the sheet feeding roller 12 is driven by the sheet transporting motor 5. As shown in FIG. 2, the hopper 11 is a plate-shaped member on which the printing sheet P can be placed. In addition, the hopper 11 is pivotable about a pivot shaft 22 provided in an upper portion of the hopper 11 by a cam mechanism (not shown). In addition, a lower end of the hopper 11 is elastically pressed against or separated from the sheet feeding roller 12 in accordance with the pivot motion. The separating pad 13 is formed of a member with a high coefficient of friction and is disposed at the position facing the sheet feeding roller 12. In addition, the sheet feeding roller 12 is not necessarily connected with the sheet transporting motor 5. For example, a driving motor used to drive the sheet feeding roller 12 may be individually provided.

Moreover, when the sheet feeding roller 12 rotates, a face of the sheet feeding roller 12 is pressed against the separating pad 13. Accordingly, when the sheet feeding roller 12 rotates, an uppermost one of the printing sheets P placed on the hopper 11 passes through a portion, at which the face of the sheet feeding roller 12 is pressed against the separating pad 13, and is then carried toward the downstream side. At this time, the separating pad 13 serves to prevent the other printing sheets P, which are placed on the hopper 11 subsequent to the uppermost printing sheet P, from being carried to the downstream side in duplicate.

The sheet transporting roller 6 is connected with the sheet transporting motor 5 directly or through a gear (not shown) provided therebetween. In addition, as shown in FIG. 2, a follower roller 23 that carries the printing sheet P together with the sheet transporting roller 6 is provided in the printer 1. The follower roller 23 is rotatably held at a downstream side of a follower roller holder 24 that is configured to be pivotable about a pivot shaft 25. The follower roller holder 24 is biased counterclockwise in the drawing by a spring (not shown), such that the follower roller 23 receives a biasing force directed toward the sheet transporting roller 6 all the time in addition, when the sheet transporting roller 6 is driven, the follower roller 23 also rotates together with the sheet transporting roller 6.

The sheet detector 14 is configured to include a detection lever 26 and a photo sensor 27 and is provided near the follower roller holder 24, as shown in FIG. 2. The detection lever 26 can pivot about a pivot shaft 28. In addition, when the printing sheet P that is in a state shown in FIG. 2 completely passes through a bottom of the detection lever 26, the detection lever 26 rotates counterclockwise. If the detection lever 26 rotates, light that moves toward a light receiving element (not shown) from a light emitting element (not shown) of the photo sensor 27 is blocked, and thus passage of the printing sheet P can be detected.

The sheet ejecting roller 15 is disposed at the downstream side of the printer 1 and is connected with the sheet transporting motor 5 through a gear (not shown) provided therebetween. In addition, as shown in FIG. 2, a follower roller 29 that ejects the printing sheet P together with the sheet ejecting roller 15 is provided in the printer 1. In the same manner as the follower roller 23, the follower roller 29 also receives, due to a spring (not shown), a biasing force directed toward the sheet ejecting roller 15 all the time. Furthermore, when the sheet ejecting roller 15 is driven, the follower roller 29 also rotates together with the sheet ejecting roller 15.

Furthermore, as shown in FIGS. 2 and 3, the printer 1 comprises a linear encoder 33 having a linear scale 31 and a photo sensor 32, as a position detector for detecting the position of the carriage 3, the speed of the carriage 3, and the like in the primary scanning direction PS. In addition, as shown in FIG. 3, the printer 1 comprises a rotary encoder 36 having a rotary scale 34 and a photo sensor, as a position detector for detecting the position of the printing sheet P, the carrying speed of the printing sheet P, and the like (specifically, for detecting the rotary position, the rotation speed, and the like of the sheet transporting roller 6) in the secondary scanning direction SS. As shown in FIG. 3, detection signals output from the linear encoder 33 and the rotary encoder 36 are input to a controller 37 that executes various kinds of control on the printer 1.

As shown in FIGS. 2 and 3, the photo sensor 32 included in the linear encoder 33 is equipped with a light emitting element 41 and a light receiving element 42. The photo sensor 32 is fixed to a rear face of the carriage 3. The linear scale 31 is formed of a long and thin plate using a transparent resin. The linear scale 31 is fixed to the support frame 16 in parallel with the primary scanning direction X. Moreover, in the linear scale 31, light transmitting parts (not shown) through which light emitted from the light emitting element 41 of the photo sensor 32 is transmitted and light blocking parts (not shown) that block the light emitted from the light emitting element 41 are alternately formed along the longitudinal direction of the linear scale 31. If the carriage 3 moves, the linear scale 31 moves relatively between the light emitting element 41 and the light receiving element 42 of the photo sensor 32. Then, according to the relative movement of the linear scale 31, the photo sensor 32 outputs a position detecting signal in a cycle corresponding to the movement speed of the carriage 3.

As shown in FIG. 3, the photo sensor 32 of the linear encoder 33 includes a light emitting element 43 and a light receiving element 44 and is fixed to the body chassis 8 through a bracket (not shown). The rotary scale 34 is formed of a thin and disc-shaped plate, which is made of transparent resin. The rotary scale 34 is fixed to the sheet transporting roller 6 so as to rotate as one body together with the sheet transporting roller 6. That is, if the sheet transporting roller 6 rotates once, the rotary scale 34 also rotates once. Further, in the rotary scale 34, light transmitting parts (not shown) through which light emitted from the light emitting element 43 of the photo sensor 35 is transmitted and light blocking parts (not shown) that block the light emitted from the light emitting element 43 are alternately formed along the circumferential direction of the rotary scale 34. If the sheet transporting roller 6 rotates, the rotary scale 34 rotates relatively between the light emitting element 43 and the light receiving element 44 of the photo sensor 35. Then, according to the relative movement of the rotary scale 34, the photo sensor 35 outputs a position detecting signal in a cycle corresponding to the movement speed of the sheet transporting roller 6.

Figure 4:
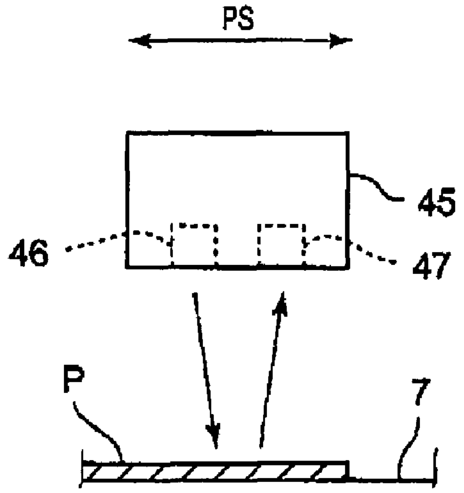
FIG. 4 is a schematic view showing a photo sensor for sheet edge detection in the ink jet printer.

Furthermore, as shown in FIGS. 2 to 4, the printer 1 comprises the photo sensor 45 for detecting an edge of the printing sheet P in the primary scanning direction PS (movement direction of the carriage 3) and an edge of the printing sheet P (that is, a leading edge and a trailing edge of the printing sheet P) in the secondary scanning direction SS. As shown in FIG. 2, the photo sensor 45 is fixed to the carriage 3. Specifically, the photo sensor 45 is fixed to a bottom face side of the carriage 3 and an upstream side (right side in FIG. 2) of the printing head 2 in the secondary scanning direction SS. Moreover, as shown in FIG. 3, the photo sensor 45 is fixed to a left end side of the carriage 3, which is shown in FIG. 3, in the primary scanning direction PS.

As shown in FIG. 4, the photo sensor 45 is a reflection-type optical sensor including a light emitting element 46, which emits light toward the platen 7 or the printing sheet P, and a light receiving element 47, on which light that is emitted from the light emitting element 46 and is then reflected by the platen 7 or the printing sheet P is incident, in order to detect an edge of the printing sheet P or the like. In the photo sensor 45, according to the movement of the carriage 3 in the primary scanning direction PS or as the printing sheet P is carried to the secondary scanning direction SS under a state in which the carriage 3 stops, light is emitted from the light emitting element 46 toward the platen 7 or the printing sheet P and then the light reflected by the platen 7 or the printing sheet P is incident on the light receiving element 47. In addition, the photo sensor 45 is electrically connected with the controller 37, as shown in FIG. 3.

Figure 5:
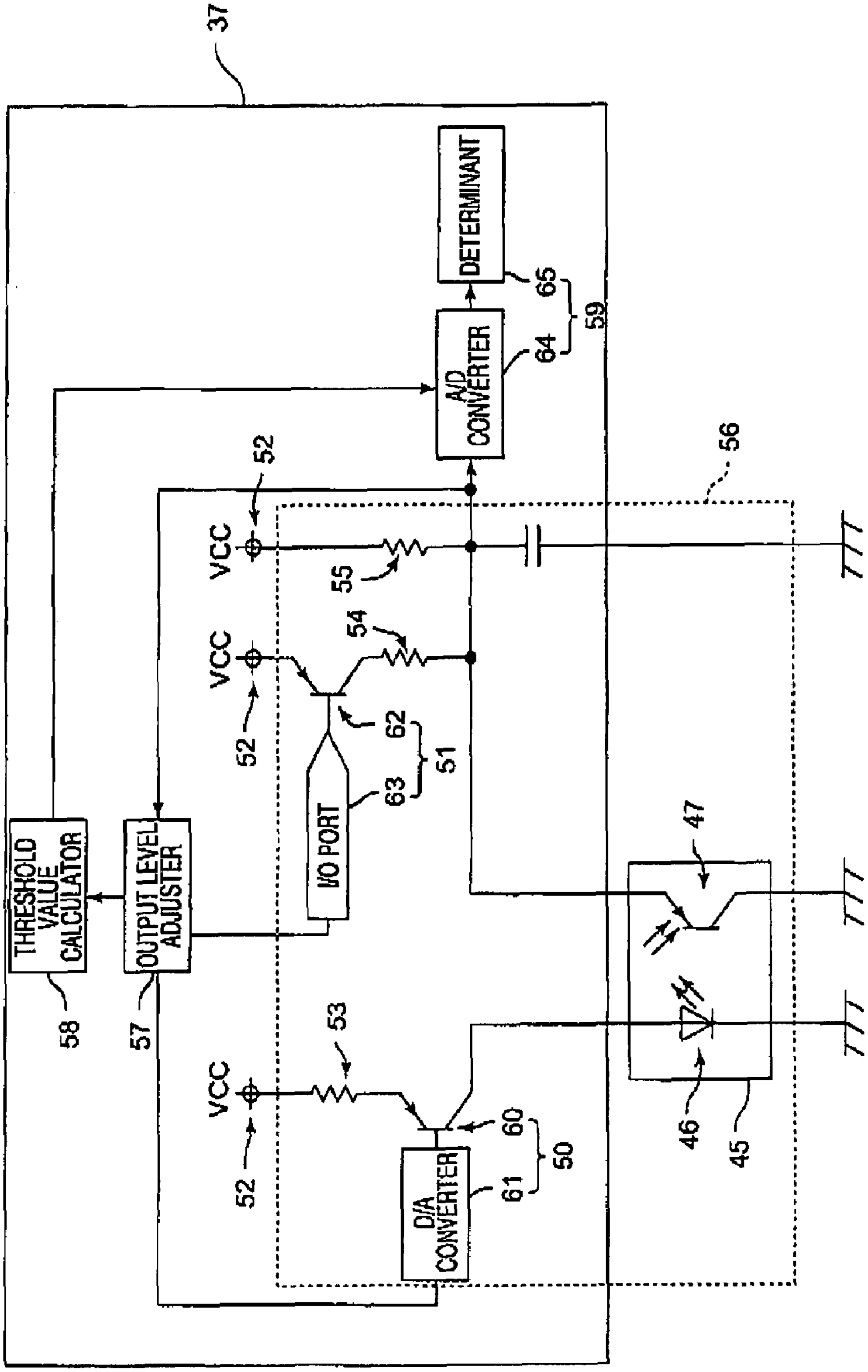
FIG. 5 is a block diagram showing a sheet edge detector in the ink jet printer.

As shown in FIG. 5, the photo sensor 45 includes a light emitting diode as the light emitting element 46 and a photo transistor as the light receiving element 47.

In FIG. 5, only the configuration within the controller 37 associated with the photo sensor 45 is shown. The controller 37 includes a luminance adjuster 50 that adjusts the luminance of the light emitting element 46, an output gain adjuster 51 that adjusts an output gain of the light receiving element 47, and an internal power supply 52 that supplies current to the light emitting element 46 and the light receiving element 47. The luminance adjuster 50 is connected with the internal power supply 52 through a resistor 53. The output gain adjuster 51 is connected with the light receiving element 47 through a resistor 54. In addition, the light receiving element 47 is connected with the internal power supply 52 through a resistor 55 disposed in parallel with respect to the output gain adjuster 51 and the resistor 54 that are disposed in series to each other. The photo sensor 45, the luminance adjuster 50, the output gain adjuster 51, the resistors 53, 54, and 55, and the like constitute an edge detecting device 56 for detecting an edge of the printing sheet P.

Further, as shown in FIG. 5, the controller 37 includes, as components associated with the photo sensor 45, an output level adjuster 57 that adjusts and checks an output signal level from the edge detecting device 56, a threshold value calculator 58 that calculates a threshold value for detecting an edge of the printing sheet P with respect to the output signal from the edge detecting device 56, and an edge detector 59 that detects the edge of the printing sheet P in cooperation with the edge detecting device 56. Actually, the output level adjuster 57, the threshold value calculator 58, and a determinant 65, which will be described later, included in the edge detector 59 are realized by an operation unit, such as a CPU, which forms the controller 37, a storage, such as a ROM, a RAM, or a non-volatile memory, an I/O (input and output) port, and the like.

The luminance adjuster 50 includes a transistor 60, which is disposed between the resistor 53 and the light emitting element 46, and a D/A converter 61 connected to a base terminal of the transistor 60. In this embodiment, the transistor 60 is a PNP transistor. That is, the light emitting element 46 is connected to a collector terminal of the transistor 60, and the internal power supply 52 is connected to an emitter terminal of the transistor 60 through the resistor 53. The D/A converter 61 is connected to the output level adjuster 57. The D/A converter 61 adjusts the luminance of the light emitting element 46 by increasing or decreasing a current flowing from the emitter terminal of the transistor 60 to the collector terminal, that is, a current supplied from the internal power supply 52 to the light emitting element 46, with prescribed resolution on the basis of a control command from the output level adjuster 57. Furthermore, the D/A converter 61 causes the supply of a current to the light emitting element 46 to stop on the basis of a control command from the output level adjuster 57. Therefore, since the supply of a current to the light emitting element 46 is stopped by the D/A converter 61 when the edge detecting device 56 is not used, it is possible to reduce the power consumption and to suppress the light emitting element 46 from deteriorating.

The output gain adjuster 51 includes a transistor 62, which is disposed between the internal power supply 52 and the resistor 54, and an I/O port 63 connected to a base terminal of the transistor 62. In this embodiment, the transistor 62 is a PNP transistor. The light receiving element 47 is connected to a collector terminal of the transistor 62 through the resistor 54, and the internal power supply 52 is connected to an emitter terminal of the transistor 62. The I/O port 63 is connected to the output level adjuster 57 and makes ON/OFF control on supply of a current from the internal power supply 52 to the light receiving element 47 on the basis of a control command from the output level adjuster 57. That is, if the I/O port 63 changes to an ON state on the basis of the control command from the output level adjuster 57, a current can be supplied from the internal power supply 52 to the light receiving element 47 through the transistor 62. If the I/O port 63 changes to an OFF state on the basis of the control command from the output level adjuster 57, a current cannot be supplied from the internal power supply 52 to the light receiving element 47 through the transistor 62.

In addition, as described above, the internal power supply 52 is connected to the light receiving element 47 through the resistor 55 disposed in parallel to the output gain adjuster 51 and the resistor 54 that are disposed in series to each other. Accordingly, if the I/O port 63 changes to the ON state, a resistance between the internal power supply 52 and the light receiving element 47 becomes a combined resistance of the resistors 54 and 55 that are disposed in parallel to each other. As a result, since a resistance between the internal power supply 52 and the light receiving element 47 decreases, a value of a current that can be supplied from the internal power supply 52 to the light receiving element 47 increases. On the other hand, if the I/O port 63 changes to the OFF state, a resistance between the internal power supply 52 and the light receiving element 47 becomes a resistance of the resistor 55. Accordingly, a value of a current that can be supplied from the internal power supply 52 to the light receiving element 47 decreases. Thus, in this embodiment, the current value that can be supplied to the light receiving element 47 is changed by making ON/OFF control on the I/O port 63, thereby adjusting the output gain of the light receiving element 47.

Figure 6A:
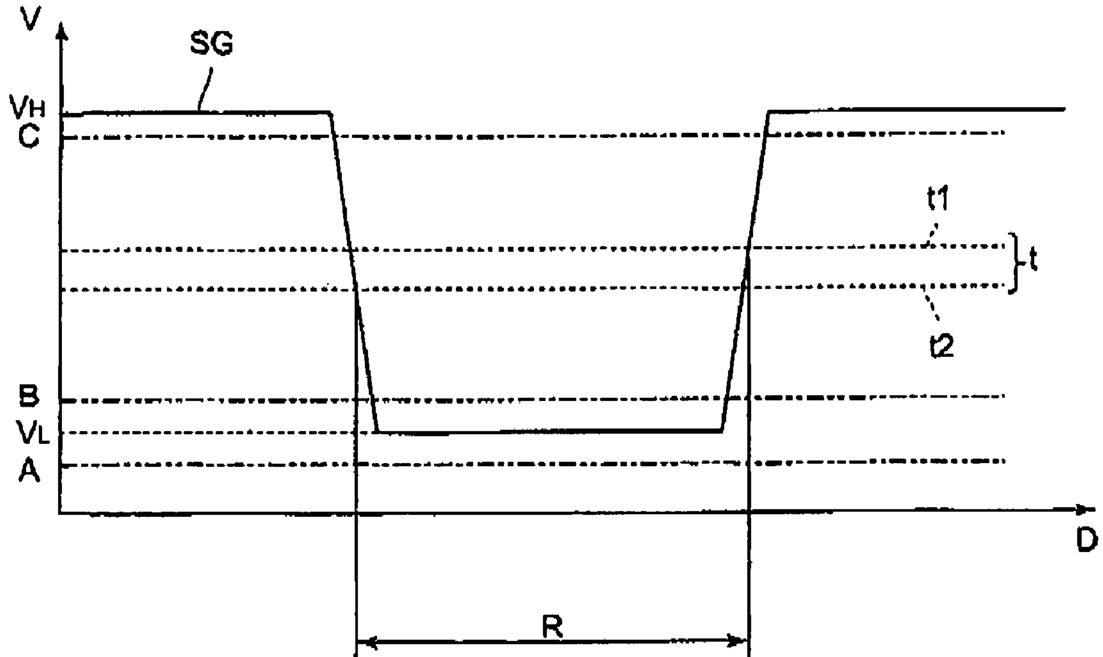
FIG. 6A is a diagram showing a waveform of a signal output from a sheet edge detecting device shown in FIG. 5.

The edge detecting device 56 outputs the output signal SG corresponding to an amount of light received in the light receiving element 47, as shown in FIG. 6A. In this figure, a vertical axis indicates a voltage V and a horizontal axis indicates a moving distance D of the carriage 3. That is, the edge detecting device 56 outputs the output signal SG whose level becomes low when the printing sheet P is detected and high when the printing sheet P is not detected. Specifically, the output signal SG changes to a low level when light, which is emitted from the light emitting element 46 and is then reflected by the printing sheet P, is received by the light receiving element 47, and changes to a high level when light, which is emitted from the light emitting element 46 and is then reflected by the platen 7, is received by the light receiving element 47. That is, in this embodiment, the platen 7 is formed by using, for example, a black member with low reflectivity and the printing sheet P reflects more light than the platen 7. Accordingly, when an amount of light received in the light receiving element 47 is large, the output signal SG changes to a low level, and when the amount of light received in the light receiving element 47 is small, the output signal SG changes to a high level. Further, when the amount of light received in the light receiving element 47 increases (that is, when a value of a current flowing through the light receiving element 47 increases), a level of the output signal SG deteriorates, and when the amount of light received in the light receiving element 47 decreases (that is, when the value of the current flowing through the light receiving element 47 decreases), the output signal level SG rises.

The output signal SG output from the edge detecting device 56 is input to the output level adjuster 57. The output level adjuster 57 is operable to adjust the level of the output signal SG to be within a prescribed range. Specifically, the output level adjuster 57 controls the D/A converter 61 and the I/O port 63 such that the output signal level SG when the printing sheet P is detected falls within a prescribed range, thereby adjusting the output signal level SG.

For example, as shown in FIG. 6A, assuming that a voltage value of the output signal SG when the output signal SG is in a low level is $V_L$, the output level adjuster 57 adjusts the output signal level SG such that the voltage value $V_L$ is within a range of a prescribed voltage value A to a prescribed voltage value B. In addition, the output level adjuster 57 checks whether or not the output signal level SG when the printing sheet P is not detected is equal to or larger than a prescribed value. For example, assuming that a voltage value of the output signal SG is $V_H$ when the output signal SG is in a high level, the output level adjuster 57 checks whether or not the voltage value $V_H$ is equal to or larger than a prescribed voltage value C.

In addition, voltage values A to C are set on the basis of the voltage value $V_L$ and a voltage value $V_H$ when the printer 1 is in an initial state (that is, a state in which there is no influence of ink mist or there is no deterioration of the light emitting element 46). For example, assuming that the voltage value $V_H$ in the initial state is 5 V and the voltage value $V_L$ in the initial state is 0.6 V, the voltage value A is 0.5 V, the voltage value B is 0.7 V, and the voltage value C is 4.7 V. That is, the output level adjuster 57 adjusts the output signal level SG such that the high level and low level of the output signal SG become equal to the levels in the initial state or become levels close to the levels in the initial state.

The threshold value calculator 58 calculates a threshold value of the output signal SG for detecting an edge of the printing sheet P, based on the level of the output signal SG. As shown in FIG. 6A, the threshold value calculator 58 in this embodiment calculates an upper threshold value t1 and a lower threshold value t2 of the output signal SG. For example, the upper threshold value t1 and the lower threshold value t2 are calculated using the following expressions based on the voltage value $V_H$ of the output signal SG when the output signal SG is in a high level and the voltage value $V_L$ of the output signal SG when the output signal SG is in a low level.

$$t1=V_L+\alpha 1(V_H-V_L)$$

$$t2=V_L+\alpha 2(V_H-V_L)$$

Where, $\alpha$1 and $\alpha$2 are prescribed coefficients. For example, $\alpha$1 is 0.55 and $\alpha$2 is 0.45. Moreover, a method of calculating the upper threshold value t1 and the lower threshold value t2 is not limited to the above expressions. For example, the upper threshold value t1 and the lower threshold value t2 may be calculated using a prescribed calculating expression using the voltage value $V_H$ and a prescribed coefficient, or the upper threshold value t1 and the lower, threshold value t2 may be calculated using a prescribed calculating expression using the voltage value $V_L$ and a prescribed coefficient.

Furthermore, as will be described later, the threshold value calculator 58 in this embodiment calculates the threshold value t of the output signal SG on the basis of the level of the output signal SG after the level adjustment and level checking with respect to the output signal SG are completed. For example, the threshold value calculator 58 calculates threshold values t1 and t2 on the basis of at least one of the voltage value $V_L$ of the output signal SG after the level adjustment and the voltage value $V_H$ of the output signal SG after the level checking.

The edge detector 59 includes the A/D converter 64 and the determinant 65. The A/D converter 64 is input with the output signal SG output from the edge detecting device 56 and a signal related to the threshold value t calculated in the threshold value calculator 58. As shown in FIG. 6A, the A/D converter 64 in this embodiment outputs a digital signal that changes from a low level to a high level (or from a high level to a low level) when a level of the output signal SG at the time of falling reaches the lower threshold value t2 and changes from a high level to a low level (or from a low level to a high level) when the output signal level SG at the time of rising reaches the upper threshold value t1. The determinant 65 determines the edge of the printing sheet P on the basis of an edge of the digital signal output from the A/D converter 64.

That is, in this embodiment, as shown in FIG. 6A, when the output signal level SG at the time of falling reaches the lower threshold value t2 and the output signal level SG at the time of rising reaches the upper threshold value t1, the edge of the printing sheet P is detected. In other words, in this embodiment, it is recognized that the printing sheet P exists in a movement range R of the carriage 3 from when the output signal level SG at the time of falling reaches the lower threshold value t2 to when the output signal level SG at the time of rising reaches the upper threshold value t1.

In the printer 1 configured as described above, the printing sheet P, which is loaded from the hopper 11 to the inside of the printer 1 by the sheet feeding roller 12 or the separating pad 13, is carried in the secondary scanning direction SS by the sheet transporting roller 6 rotatably driven by the sheet transporting motor 5, and the carriage 3 driven by the carriage motor 4 reciprocates in the primary scanning direction PS. When the carriage 3 reciprocates, ink droplets are ejected from the printing head 2 such that printing on the printing sheet P is performed. Moreover, when the printing on the printing sheet P is completed, the printing sheet P is ejected to the outside of the printer 1 by the sheet ejecting roller 15 or the like.

When the carriage 3 moves, a position detecting signal is output from the linear encoder 33. The output position detecting signal is input to the controller 37. Then, the controller 37 detects the position, speed, and the like of the carriage 3 from the input position detecting signal. Then, various kinds of control of the printer 1 are performed on the basis of the detected position, speed, and the like of the carriage 3. Furthermore, when the carriage 3 moves, the output signal SG shown in FIG. 6A is output from the edge detecting device 56. The output signal SG is input to the edge detector 59, and the edge detector 59 detects the edge of the printing sheet P in the primary scanning direction PS using the input output signal SG and the threshold value t. Then, various kinds of control of the printer 1 are performed on the basis of a detection result of the edge of the printing sheet P. For example, a control of the printing head 2 (for example, control of an amount of ink ejected from the printing head 2 or eject timing of ink ejected from the printing head 2) is performed.

Furthermore, in this embodiment, the printing sheet P is carried in the secondary scanning direction SS by the sheet transporting roller 6 or the like under the state in which the carriage 3 stops at the position at which the printing sheet P can be detected by the edge detecting device 56. Then, on the basis of the output signal SG and the threshold value t at this time, the edge detector 59 detects a leading edge of the printing sheet P in the secondary scanning direction SS. Furthermore, in this embodiment, even though it is detected by the edge detecting device 56 whether or not a trailing edge of the printing sheet P has moved outside the detection range of the edge detecting device 56, detection of the rear edge of the printing sheet P is not performed.

Moreover, in this embodiment, when a command for executing printing onto the printing sheet P is input to the controller 37, an adjustment of a level of the output signal SG of the edge detecting device 56 is performed, and the threshold value t for the output signal SG is then calculated. Hereinafter, a method of adjusting the output signal level SG and calculating the threshold level t for the output signal SG will be described. Furthermore, in this embodiment, in the case of continuous printing in which printing is continuously performed with respect to the plurality of printing sheets P, the level adjustment of the output signal SG and the calculation of the threshold value t are performed when a printing command for the first printing sheet P is input to the controller 37 but the level adjustment of the output signal SG and the calculation of the threshold value t are not performed even if the printing command for the second printing sheet P or the printing sheet P subsequent to the second printing sheet P is input to the controller 37.

In this embodiment, the level adjustment of the output signal SG is first performed such that a level (that is, low level) when the edge detecting device 56 detects the printing sheet P is within a prescribed range. Specifically, in this embodiment, the level adjustment of the output signal SG is performed such that the voltage value $V_L$ of the output signal SG when the output signal SG is in the low level falls within a range of the voltage value A to the voltage value B. In this embodiment, the level adjustment of the output signal SG is performed only by adjustment of luminance of the light emitting element 46, and an adjustment of an output gain of the light receiving element 47 is not performed.

Figure 7:
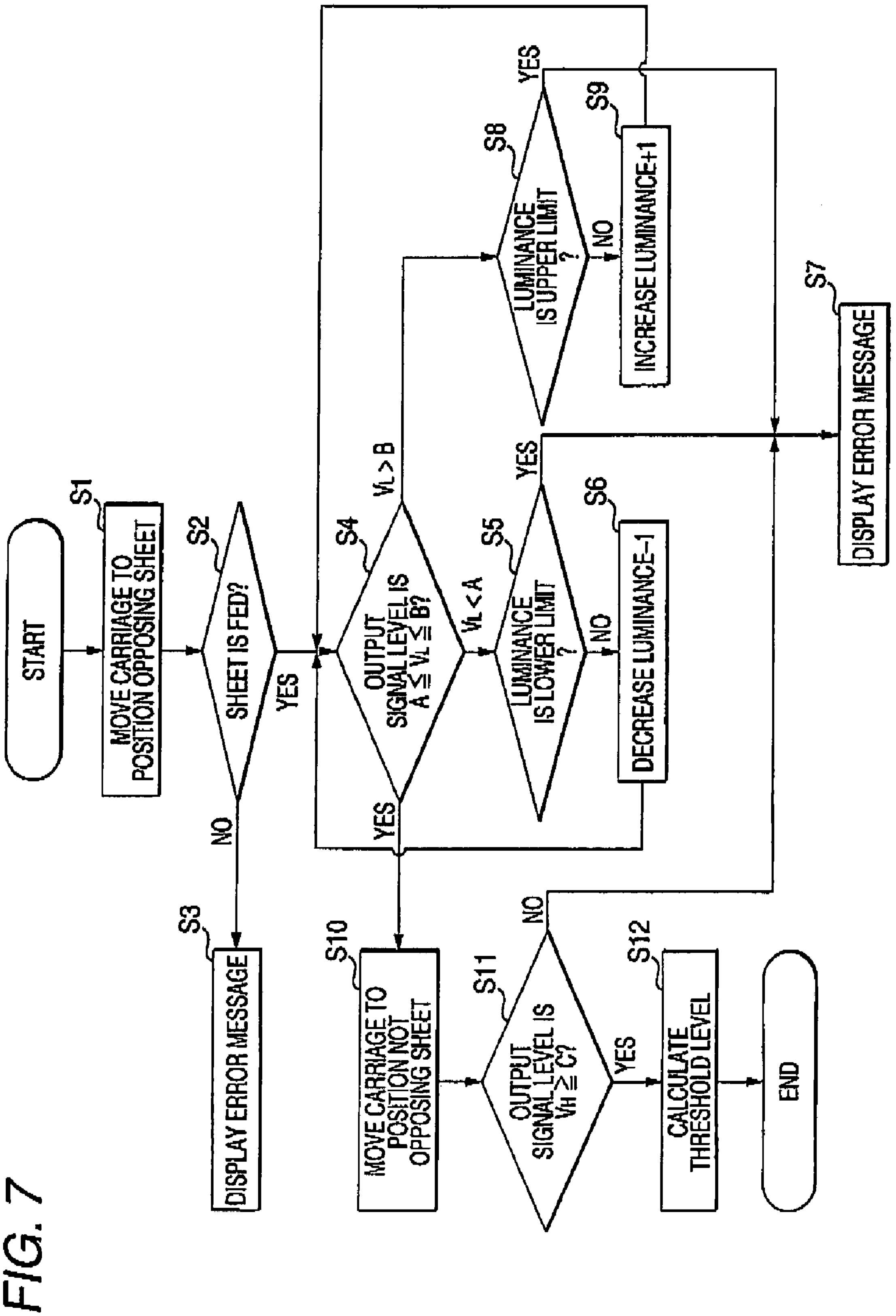
FIG. 7 is a flowchart showing a method of adjusting an output signal level of the sheet edge detecting device.

As shown in FIG. 7, first, under the state in which the printing sheet P is not loaded inside the printer 1, the carriage 3 moves up to the position, at which the printing sheet P can be detected by the edge detecting device 56, and then stops (step S1). In this state, the printing sheet P is carried up to the position, at which the printing sheet P is surely detected by the edge detecting device 56, in the secondary scanning direction SS by the sheet transporting roller 6 or the like, thereby determining whether or not the printing sheet P has been fed to the inside of the printer 1 (that is, determining whether or not the printing sheet P has been detected by the edge detecting device 56) (step 82). If it is determined that the printing sheet P is not fed in step S2, for example, an error message is displayed because a sheet feeding error occurs (step S3).

On the other hand, if it is determined that the printing sheet P is fed in step S2, it is determined whether or not a level of the output signal SG is within a prescribed range (step S4). Specifically, in step S4, it is determined whether or not a level (that is, low level) of the output signal SG when the printing sheet P is detected is within the prescribed range. In this embodiment, in step S4, it is determined whether or not the voltage value $V_L$ of the output signal SG when the output signal SG is in the low level is within the range of the voltage value A to the voltage value B. The determination is made by the output level adjuster 57.

If it is determined that the voltage value $V_L$ is smaller than the voltage value A in step S4, it is determined whether or not the luminance of the light emitting element 46 is a lower limit (step S5). That is, in the case when the voltage value $V_L$ is smaller than the voltage value A, it is determined that the luminance of the light emitting element 46 is high, and then, in step S5, it is determined whether or not the luminance of the light emitting element 48 can be lowered. The determination is also made by the output level adjuster 57.

If it is determined that the luminance of the light emitting element 46 is not a lower limit in step S5, the luminance of the light emitting element 46 is reduced by a prescribed amount (step S6). Specifically, the D/A converter 61 reduces a current supplied from the internal power supply 52 to the light emitting element 46 on the basis of a control command from the output level adjuster 57. If the luminance of the light emitting element 46 is reduced by the prescribed amount, the process returns to step S4 to determine whether or not the voltage value $V_L$ of the output signal SG is within the range of the voltage value A to the voltage value B. On the other hand, if the luminance of the light emitting element 46 is a lower limit in step S5, an error message that the voltage value $V_L$ of the output signal SG cannot be adjusted within the range of the voltage value A to the voltage value B is displayed (step 87).

In addition, if it is determined that the voltage value $V_L$ is larger than the voltage value B in step S4, it is determined whether or not the luminance of the light emitting element 46 is at an upper limit (step S8). That is, in the case when the voltage value $V_L$ is larger than the voltage value B, it is determined that the luminance of the light emitting element 46 is low, and then, in step S8, it is determined whether or not the luminance of the light emitting element 46 can be raised. The determination is also made by the output level adjuster 57.

If it is determined that the luminance of the light emitting element 46 is not an upper limit in step S8, the luminance of the light emitting element 46 is increased by a prescribed amount (step S9). Specifically, the D/A converter 61 increases the current supplied from the internal power supply 52 to the light emitting element 46 on the basis of a control command from the output level adjuster 57. If the luminance of the light emitting element 46 is increased by the prescribed amount, the process returns to step S4 to determine whether or not the voltage value $V_L$ of the output signal SG is within the range of the voltage value A to the voltage value B. On the other hand, if the luminance of the light emitting element 46 is an upper limit in step S8, an error message that the voltage value $V_L$ of the output signal SG cannot be adjusted to be within the range of the voltage value A to the voltage value B is displayed (step 87).

In addition, if it is determined that the voltage value $V_L$ is within the range of the voltage value A to the voltage value B in step S4, the carriage 3 moves up to the position, at which the printing sheet P cannot be detected by the edge detecting device 56, and then stops (step 810). In this state, the output signal level SG is checked (level checking step; S11). Specifically, in step S10, it is determined whether or not a level (that is, high level) of the output signal SG when the printing sheet P is not detected is within the prescribed range. In this embodiment in step S10, it is determined whether or not the voltage value $V_H$ of the output signal SG when the output signal SG is in the high level is equal to or larger than a prescribed value C. The determination is made by the output level adjuster 57.

If it is determined that the voltage value $V_H$ is less than the prescribed value C, it is determined that the level adjustment of the output signal SG is not proper, and thus an error message is displayed (step S7). On the other hand, if it is determined that the voltage value $V_H$ is equal to or larger than the prescribed value C, the threshold value t is calculated (threshold value calculating step; step S12). That is, in the case when the voltage value $V_H$ is equal to or larger than the prescribed value C, it is determined that the level adjustment of the output signal SG is proper, and accordingly, the threshold value t of an output signal is calculated. Specifically, as described above, the threshold value calculator 58 calculates an upper threshold value t1 and a lower threshold value t2 of the output signal SG on the basis at least one of: the voltage value $V_L$ of the output signal SG after the level adjustment is so performed as to fall between the voltage value A and the voltage value B; and the voltage value $V_H$ of the output signal SG for which the level checking is performed after the level of the voltage value $V_L$ of the output signal SG is so adjusted as to fall between the voltage value A and the voltage value B. Then, by the calculation of the threshold value t in step S12, the level adjustment of the output signal SG and the calculation of the threshold value t of the output signal SG are completed.

As described above, in this embodiment, the controller 37 includes the output level adjuster 57 that adjusts the level of the output signal SG from the edge detecting device 56 so as to fall within the prescribed range, and the level of the output signal SG from the edge detecting device 56 is adjusted to fall within the prescribed range. Accordingly, since it is possible to suppress the level of the output signal SG from fluctuating, it is possible to maintain the detection accuracy of the edge detecting device 56.

As described above, in this embodiment, the edge detecting device 56 includes the luminance adjuster 50 for adjusting the luminance of the light emitting element 46. Moreover, the luminance adjuster 50 adjusts the luminance of the light emitting element 46 in the luminance adjusting steps including steps S4 to S6, S8, and S9. Thus, due to adjustment of the luminance of the light emitting element 46 in the luminance adjusting step, it is possible to adjust the output signal level SG of the edge detecting device 56 that is output corresponding to the amount of light received in the light receiving element 47. Accordingly, since it is possible to suppress the output signal level SG from fluctuating, the detection accuracy of the edge detecting device 56 can be maintained.

Figure 6B:
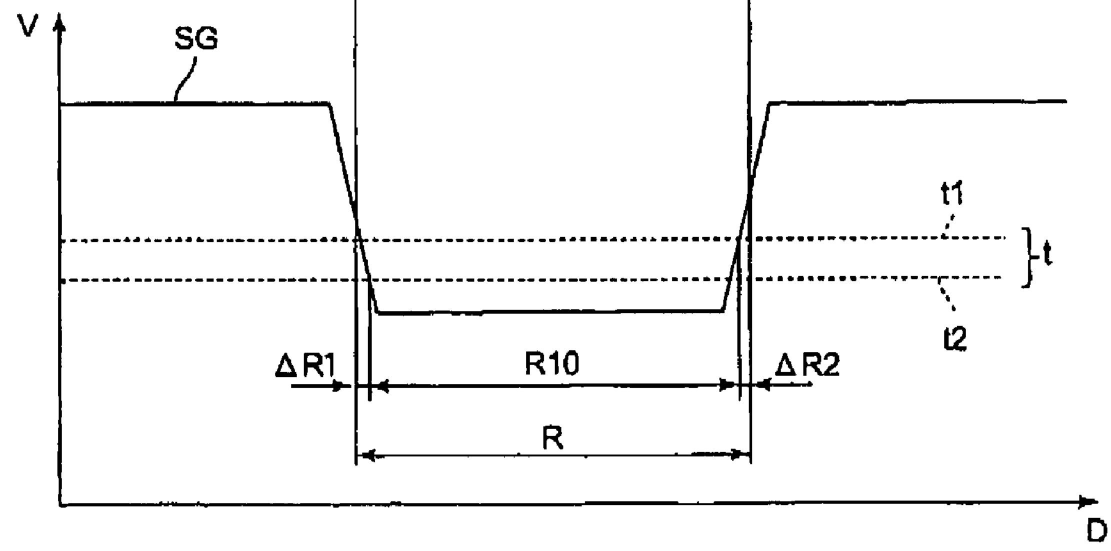
FIG. 6B is a diagram showing a waveform of a signal output from a sheet-edge detecting device according to a comparative example.

In this embodiment, the level of the output signal SG from the edge detecting device 56 is so adjusted as to fall within the prescribed range. Therefore, the output level adjuster 57 can adjust an amount of fluctuation of the level of the output signal SG occurring due to the influence of the ink mist, temporal deterioration of the light emitting element 46, and the like. That is, as shown in FIG. 6B, even in a case where the level of the output signal SG fluctuates due to adherence of the ink mist, temporal deterioration of the light emitting element 46, and the like, the output level adjuster 57 can adjust the level of the output signal SG to a level equal to that before the level fluctuation occurs or a level close to that before the level fluctuation occurs, as shown in FIG. 6A. For example, in this embodiment the output level adjuster 57 can adjust the voltage value $V_L$ of the output signal SG when the output signal SG is in the low level to fall within a range between the voltage value A and the voltage value B.

Further, in this embodiment, the controller 37 comprises the threshold value calculator 58 that calculates the threshold value t of the output signal SG on the basis of the level of the output signal SG after the adjustment. Accordingly, it is possible to calculate the threshold value t on the basis of the level of the output signal SG that is adjusted to the level equal to that before the level fluctuation occurs or the level close to that before the level fluctuation occurs. For example, the threshold value t can be calculated on the basis of the voltage value $V_L$ adjusted to be within the range between the voltage value A and the voltage value B. Therefore, it is possible to calculate the threshold value t equal to that before the level fluctuation occurs or the threshold value t close to that before the level fluctuation occurs. Thus, in this embodiment, it is possible to maintain the relationship between the threshold value t and the output signal SG before and after the level fluctuation of the output signal SG, which occurs due to adherence of the ink mist, temporal deterioration of the light emitting element 46, and the like, in almost the same state. As a result, it is possible to greatly suppress an error from occurring at the detection position of the end of the print sheet P. That is, it is possible to reliably maintain the detection accuracy of the edge detecting device 56.

Furthermore, since it is possible to maintain the level of the output signal SG before and after the level fluctuation of the output signal SG, which occurs due to the adherence of the ink mist, the temporal deterioration of the light emitting element 46, and the like, in almost the same level, the threshold value calculator 58 can calculate the appropriate threshold value t with the above simple calculation expression based on the level of the output signal SG after the adjustment. That is, in this embodiment, it is possible to calculate the threshold value t of the output signal SG with the simple operation using the simple calculation expression.

Furthermore, immediately after starting to use the printer 1 that is rarely affected by the ink mist, the edge of the printing sheet P may be properly detected by the edge detecting device 56 even if the luminance of the light emitting element 46 is suppressed. With the configuration according to this embodiment, the luminance of the light emitting element 46 can be suppressed to be low immediately after starting to use the printer 1, and then the output signal level SG is adjusted by causing the luminance adjuster 50 to increase the luminance of the light emitting element 46 in accordance with the influence of the ink mist, deterioration of the light emitting element 46, and the like, thereby suppressing the level fluctuation of the output signal SG. That is, in this embodiment, the level fluctuation of the output signal SG can be suppressed even if the luminance of the light emitting element 46 does not increase more than needed. Accordingly, it is possible to suppress the deterioration of the light emitting element 46 that is a cause of the level fluctuation of the output signal SG. As a result, in this embodiment, it is possible to effectively suppress the level fluctuation of the output signal SG, which makes it possible to effectively maintain the detection accuracy of the edge detecting device 56. In addition, the effects are remarkable in a commercial printer having a long operation time period and a long light emission time period of the light emitting element 46 as compared with a home-use printer.

Particularly in this embodiment, the luminance of the light emitting element 46 is adjusted by the luminance adjuster 50 of the edge detecting device 56 that detects the edge of the printing sheet P, thereby adjusting the output signal level SG to be within the prescribed range. Therefore, since it is possible to maintain the detection accuracy of the edge of the printing sheet P, the edge of the printing sheet P can be stably detected. As a result, even in the case of performing so-called marginless printing on the printing sheet P, it is possible to reduce the amount of ink ejected to the outside of the printing sheet P, that is, the amount of discarded ink.

Figure 8:
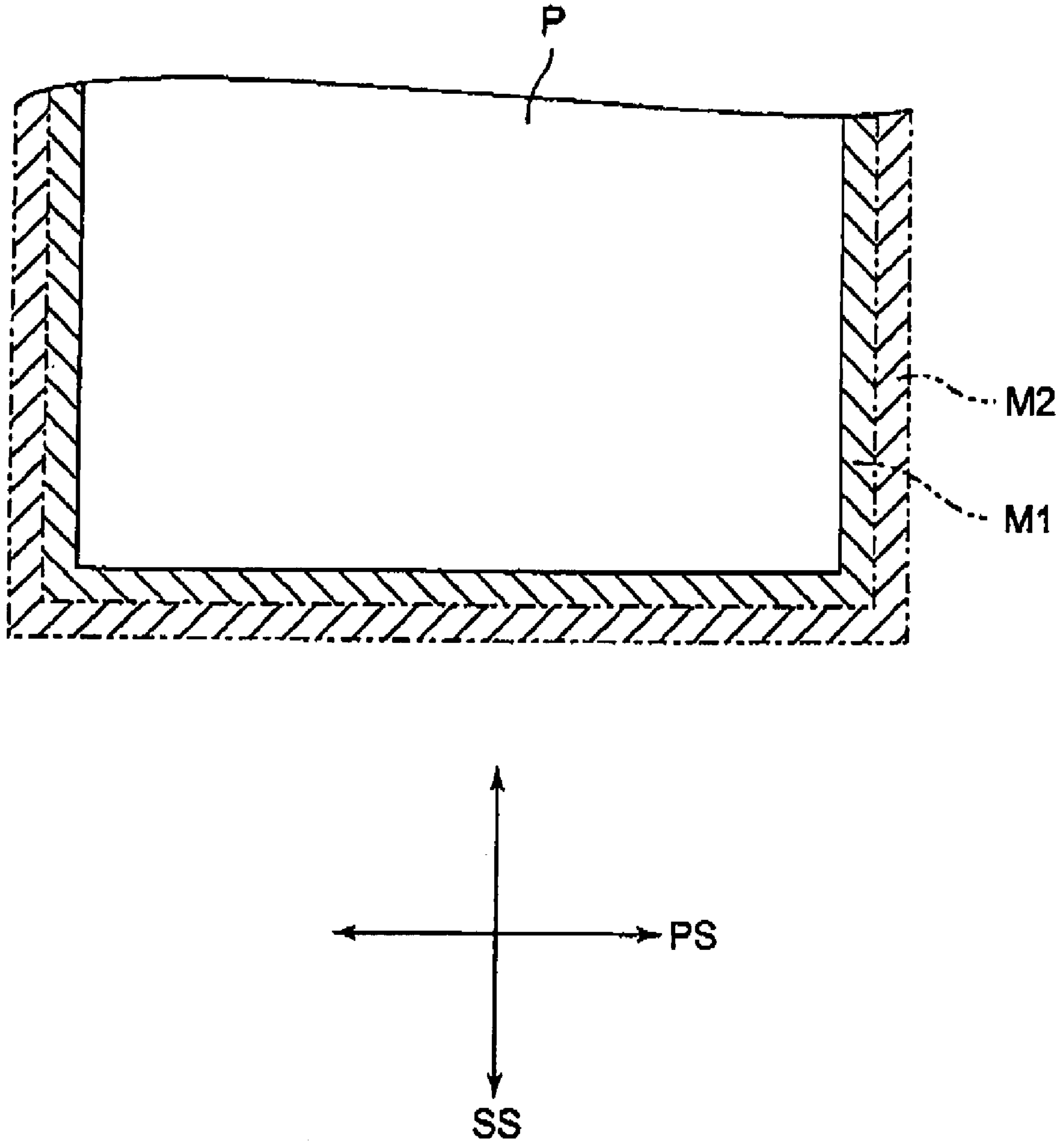
FIG. 8 is a diagram for explaining an advantage of the invention.

That is, in the case when an error that occurs as time goes by at the detection position of the edge of the printing sheet P is large such that the edge of the printing sheet P cannot be stably detected, for example, the printing head 2 needs to eject ink in a wide range including a region M1 and a region M2 in addition to the printing sheet P in order to maintain a suitable printing state of marginless printing, as shown in FIG. 8. In contrast, in the case when there is little error that occurs as time goes by at the detected position of the edge of the printing sheet P, it is possible to maintain the suitable printing state of the marginless printing even if the printing head 2 ejects ink in a range including only the region M1 in addition to the printing sheet P. Thus, in this embodiment, even in the case of performing the marginless printing on the printing sheet P, it is possible to reduce the amount of discarded ink.

As a result, it is also possible to suppress occurrence of the ink mist that is a cause of the level fluctuation of the output signal SG of the edge detecting device 56. In addition, since the amount of discarded ink can be considerably reduced in a commercial printer that performs printing on the large-sized printing sheet P, such as A1 or A2 sheet, the above-mentioned effects are even more remarkable in the commercial printer than the home-use printer that performs printing on the small-sized printing sheet P, such as A4 sheet (definition according to Japanese Industrial Standard).

In this embodiment, the luminance of the light emitting element 46 is adjusted such that the output signal level SG at the time of detection of the printing sheet P falls within a prescribed range. A level of the output signal SG at the time of detection of the printing sheet P, at which light emitted from the light emitting element 46 is received even more in the light receiving element 47, fluctuates largely due to the influence of the ink mist, the temporal reduction in the amount of light emission of the light emitting element 46, and the like, as compared with that of the output signal SG when the printing sheet P is not detected. Therefore, by adjusting the luminance of the light emitting element 46 such that the output signal level SG at the time of detection of the printing sheet P falls within the prescribed range, it is possible to more effectively suppress the level fluctuation of the output signal SG and to effectively maintain the detection accuracy of the edge detecting device 56.

In the embodiment described above, the level adjustment of the output signal SG is performed by adjusting only the luminance of the light emitting element 46. In addition to the luminance adjustment of the light emitting element 46, for example, the level adjustment of the output signal SG may also be performed by adjusting an output gain of the light receiving element 47.

Figure 9:
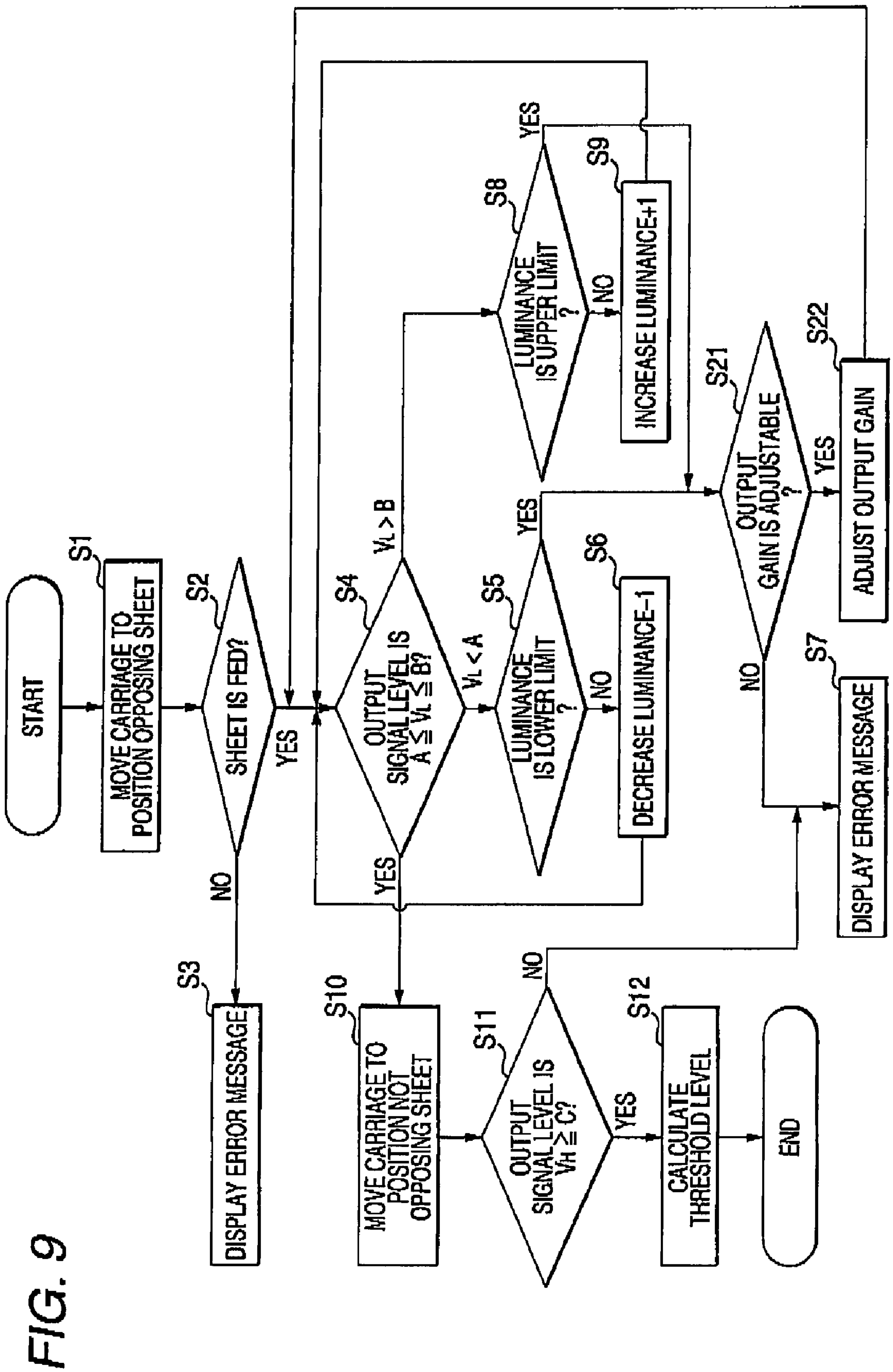
FIG. 9 is a flowchart showing a method of adjusting an output signal level of the sheet edge detecting device, according to a modified example.

That is, as shown in FIG. 9, in the method of adjusting the output signal level SG in the above embodiment, an output gain of the light receiving element 47 may be adjusted if it is determined that the luminance of the light emitting element 46 is a lower limit in step S5 or if it is determined that the luminance of the light emitting element 46 is an upper limit in step S8 (that is, in the case when the output signal SG cannot be adjusted to fall within a prescribed range), and then the output signal level SG may be adjusted by performing the luminance adjustment of the light emitting element 46 again. Hereinafter, a method of adjusting the output signal level SG in the above case will be described.

In FIG. 9, the same steps as in FIG. 7 are denoted by the same reference numerals.

If it is determined that the luminance of the light emitting element 46 is a lower limit in step S5, it is determined that the output gain of the light receiving element 47 can be adjusted (step S21). Specifically, an ON/OFF state of the I/O port 63 is checked in step S21. In the case when the luminance of the light emitting element 46 is the lower limit, it is necessary to raise the output signal level SG by lowering a value of a current that can be supplied from the internal power supply 52 to the light receiving element 47. Accordingly, in this case, in step S21, it is determined that the output gain of the light receiving element 47 can be adjusted if the I/O port 63 is in the ON state, but it is determined that the output gain of the light receiving element 47 cannot be adjusted if the I/O port 63 is in the OFF state. The determination in step S21 is made by the output level adjuster 57.

If it is determined that the output gain of the light receiving element 47 can be adjusted in step S21, the output gain of the light receiving element 47 is adjusted (step S22). Specifically, in this case, the I/O port 63 changes to the OFF state on the basis of a control command from the output level adjuster 57. If the output gain of the light receiving element 47 is adjusted in step S22, the process returns to step S4 to determine whether or not the voltage value $V_L$ of the output signal SG is within the range of the voltage value A to the voltage value B. On the other hand, if it is determined that the output gain of the light receiving element 47 cannot be adjusted in step S21, an error message that the voltage value $V_L$ of the output signal SG cannot be adjusted to be within the range of the voltage value A to the voltage value B is displayed (step S7).

Further, as shown in FIG. 9, if it is determined that the luminance of the light emitting element 46 is an upper limit in step S8, it is determined that the output gain of the light receiving element 47 can be adjusted in step S21. In the case when the luminance of the light emitting element 46 is the upper limit, it is necessary to lower the output signal level SG by raising a value of a current that can be supplied from the internal power supply 52 to the light receiving element 47. Accordingly, in this case, in step S21, it is determined that the output gain of the light receiving element 47 can be adjusted if the I/O port 63 is in the ON state, but it is determined that the output gain of the light receiving element 47 cannot be adjusted if the I/O port 63 is in the OFF state.

If it is determined that the output gain of the light receiving element 47 can be adjusted in step S21, the output gain of the light receiving element 47 is adjusted in step S22. Specifically, in this case, the I/O port 63 changes to the ON state on the basis of the control command from the output level adjuster 57. If the output gain of the light receiving element 47 is adjusted in step S22, the process returns to step S4 to determine whether or not the voltage value $V_L$ of the output signal SG is within the range of the voltage value A to the voltage value B. On the other hand, if it is determined that the output gain of the light receiving element 47 cannot be adjusted in step S21, an error message that the voltage value $V_L$ of the output signal SG cannot be adjusted to be within the range of the voltage value A to the voltage value B is displayed (step S7).

Thus, in the method of adjusting the output signal level SG shown in FIG. 9, steps S21 and S22 are gain adjusting steps for adjusting the output gain of the light receiving element 47. In addition, the luminance adjusting step of steps S4 to S6, S8, and S9 and the gain adjusting step of steps S21 and S22 serve as the level adjusting step for adjusting the level of the output signal SG to be within the prescribed range. Moreover, in the method of adjusting the output signal level SG including the luminance adjusting step of steps S4 to S6, S8, and S9 and the gain adjusting step of steps S21 and S22, it is possible to adjust the output signal level SG in a wide range by adjusting the luminance of the light emitting element 46 again after the gain adjusting step even in the case in which the output signal level SG cannot be adjusted with only the luminance adjusting step.

Therefore, even if the fluctuation amount of the output signal level SG is large, it becomes possible to adjust the output signal level SG to be within a narrow range. As a result, the detection accuracy of the edge detecting device 56 can be appropriately maintained. In addition, for example, if the output gain of the light receiving element 47 is raised in the gain adjusting step (that is, if the I/O port 63 is turned on to raise a current that can be supplied from the internal power supply 52 to the light receiving element 47), it becomes possible to reduce the luminance of the light emitting element 46. As a result, it is possible to more effectively suppress deterioration of the light emitting element 46 that is a cause of the level fluctuation of the output signal SG.

In addition, the level adjustment of the output signal SG may be made by only the adjustment of the output gain of the light receiving element 47.

Moreover, in the embodiment described above, the threshold value t is calculated each time the level adjustment and checking on the output signal SG are completed. However, the threshold value t may not be calculated each time the level adjustment and checking on the output signal SG are completed. For example, the threshold value t may be calculated a prescribed number of times after the level adjustment and checking on the output signal SG are completed.

In the above embodiment, the configuration of the optical sensor according to the invention has been described using the edge detecting device 56 as an example. However, the configuration of the invention may also be applied to other optical sensors, such as the sheet detector 14, the linear encoder 33, and the rotary encoder 36. In the case of applying the configuration of the invention to the sheet detector 14, the printing sheet P is an object to be detected by the sheet detector 14. In addition, in the case of applying the configuration of the invention to the linear encoder 33, the carriage 3 is an object to be detected by the linear encoder 33. In addition, in the case of applying the configuration of the invention to the rotary encoder 36, the sheet transporting roller 6 is an object to be detected by the rotary encoder 36.

In the embodiment described above, the edge detecting device 56 is configured to include: the photo sensor 45; and the luminance adjuster 50, the output gain adjuster 51, the resistors 53, 54, and 55, and the like included in the controller 37.

In addition, for example, the photo sensor 45 itself may include the circuit configuration of the luminance adjuster 50, the output gain adjuster 51, the resistors 53, 54, and 55, and the like.

In the embodiment described above, the photo sensor 45 included in the edge detecting device 56 is a reflection-type detector. However, for example, a detector included in a detecting device may be a transmission-type detector obtained by disposing a light emitting face of a light emitting element and a light receiving face of a light receiving element to be opposite to each other. In this case, it is preferable to adjust the luminance of the light emitting element such that the level of an output signal when an object to be detected is not detected falls within a prescribed range. As described above, the level of an output signal when light emitted from the light emitting element is received even more in the light receiving element fluctuates largely due to the influence of ink mist, the temporal reduction in an amount of light emission of the light emitting element, and the like. Accordingly, with the configuration described above, it is possible to appropriately suppress the level fluctuation of an output signal and to more appropriately maintain the detection accuracy of a detecting device.

Moreover, in the case where the transmission-type detector is adopted, it is preferable to include a step for checking the level of an output signal at the time of detecting an object to be detected after adjusting the output signal level at the time of non-detection of the object to be detected.

In the embodiment described above, the ink cartridge 21 is mounted in the carriage 3. Alternatively, for example, the ink cartridge may be fixed to the body chassis 8. In this case, the ink cartridge 21 fixed to the body chassis 8 and the printing head 2 mounted in the carriage 3 are connected to each other through a flexible tube for ink supply.

In the embodiment described above, the light receiving element 47 is a photo transistor. However, the light receiving element 47 may be a photo diode. Moreover, the configuration of the luminance adjuster 50 is not limited to the configuration described above. For example, a variable resistor may be used instead of the D/A converter 61. In addition, the transistor 60 may be an NPN transistor or a field effect transistor (FET). Similarly, the transistor 62 included in the output gain adjuster 51 may be the NPN transistor or FET. In addition, the edge detecting device 56 may not necessarily include the output gain adjuster 51.

In addition, the edge detecting device 56 may not necessarily comprise both the luminance adjuster 50 and the output gain adjuster 51. For example, the edge detecting device 56 may comprise only one of the adjuster 50 and the output gain adjuster 51.

In addition, the above-described method of calculating the threshold value t may be applied to an apparatus other than the printer 1 as long as the apparatus includes an optical sensor.

The liquid ejecting apparatus is not limited to the ink jet printer which employs an ink jet print head. The liquid ejecting apparatus is employed to encompasses an apparatus that ejects a liquid appropriate to an application, in place of ink, from a liquid ejecting head corresponding to the ink jet recording head onto a target medium corresponding to a recording medium, thereby causing the liquid to adhere to the medium.

In addition to the recording head, the liquid ejecting head encompasses a coloring material ejecting head used for manufacturing a color filer such as a liquid crystal display or the-shaped; an electrode material (conductive paste) ejecting head used for forming electrodes, such as an organic EL display or a field emission display (FED) or the-shaped; a bio-organic substance ejecting head used for manufacturing a bio-chip; a sample ejecting head serving as a precision pipette; and the-shaped.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

The disclosure of Japanese Patent Application No. 2006-101678 filed Apr. 3, 2006 including specification, drawings and claims is incorporated herein by reference in its entirety.

What is claimed is:

1. A method of calculating a threshold value for a detection signal output from an optical sensor in accordance with a state of a target object in a liquid ejecting apparatus, the method comprising:

providing the optical sensor so as to include a light emitting element operable to irradiate the target object and a light receiving element operable to detect a light amount which varies in accordance with the state of the target object;

outputting the detection signal from the optical sensor, based on the detected light amount;

adjusting a level of the detection signal so as to fall within a prescribed range; and calculating the threshold value based on the adjusted level of the detection signal.

2. The method as set forth in claim 1, wherein:

the level of the detection signal is adjusted by adjusting luminance of the light emitting element.

3. The method as set forth in claim 1 further comprising:

adjusting an output gain of the light receiving element in a case where it is impossible to cause the level of the detection signal to fall within the prescribed range; and adjusting the luminance of the light emitting element again, after the output gain of the light receiving element is adjusted.

4. The method as set forth in claim 1, wherein:

the level of the detection signal is so adjusted that a signal level obtained when the target object is detected falls within the prescribed range, in a case where the light receiving element is adapted to receive light reflected from the target medium.

5. A liquid ejecting apparatus, comprising:

an optical sensor, operable to output a detection signal indicative of a state of a target object, the optical sensor including a light emitting element operable to irradiate the target object and a light receiving element operable to detect a light amount which varies in accordance with the state of the target object;

a signal level adjuster, operable to adjust a level of the detection signal so as to fall within a prescribed range; and a calculator, operable to calculate a threshold value for the detection signal based on the level of the detection signal adjusted by the signal level adjuster.

6. The liquid ejecting apparatus as set forth in claim 5, further comprising:

a liquid ejecting head, operable to eject liquid toward a target medium; and a carriage, operable to carry the liquid ejecting head in a prescribed direction, wherein:

the optical sensor is provided on the carriage; and the target object is an edge of the target medium.

7. The liquid ejecting apparatus as set forth in claim 5, wherein:

the light receiving element is adapted to receive light reflected from the target object.

* * * * *